(12) United States Patent
Rapp

(10) Patent No.: US 9,436,347 B2
(45) Date of Patent: Sep. 6, 2016

(54) METHODS AND SYSTEMS FOR ENTERING OBJECT ASSIGNMENTS

(71) Applicant: SAP SE, Walldorf (DE)

(72) Inventor: Roman A. Rapp, Villeneuve Loubet (FR)

(73) Assignee: SAP SE, Walldorf (DE)

( * ) Notice: Subject to any disclaimer, the term of this patent is extended or adjusted under 35 U.S.C. 154(b) by 305 days.

(21) Appl. No.: 13/938,581

(22) Filed: Jul. 10, 2013

(65) Prior Publication Data

US 2013/0305192 A1    Nov. 14, 2013

Related U.S. Application Data

(63) Continuation of application No. 11/100,515, filed on Apr. 7, 2005, now Pat. No. 8,543,943.

(51) Int. Cl.
*G06F 3/0481* (2013.01)
*G06F 9/44* (2006.01)

(52) U.S. Cl.
CPC ........... *G06F 3/0481* (2013.01); *G06F 9/4443* (2013.01)

(58) Field of Classification Search
CPC .......................... G06F 3/0481; G06F 9/4443
USPC ......................................................... 715/853
See application file for complete search history.

(56) References Cited

U.S. PATENT DOCUMENTS

| 4,821,211 | A | 4/1989 | Torres |
| 5,542,086 | A | 7/1996 | Andrew et al. |
| 5,710,894 | A | 1/1998 | Maulsby et al. |
| 5,886,699 | A | 3/1999 | Belfiore et al. |
| 5,917,492 | A | 6/1999 | Bereiter et al. |
| 6,115,044 | A | 9/2000 | Alimpich et al. |

(Continued)

FOREIGN PATENT DOCUMENTS

| EP | 1331553 A1 | 7/2003 |
| EP | 1376323 A1 | 1/2004 |

(Continued)

OTHER PUBLICATIONS

ABC Technologies Inc. "OROS ABC Plus User's Guide," ABC Technologies Inc. 1998, pp. 83-94.*

(Continued)

*Primary Examiner* — David Phantana Angkool

(57) ABSTRACT

Methods, systems and computer program products are provided for entering object assignments. In one implementation, a system is provided that comprises means for storing first and second object hierarchies, the second object hierarchy including a plurality of objects and at least one folder object being the root of a sub-hierarchy of objects, and each object of the first and second object hierarchies having an object type of a pre-defined set of object types. The system may further comprise a rule base for storage of object types and associated sub-sets, means for displaying the object hierarchies on a graphical user interface which enables a user's selection of the first object from the first object hierarchy and displays an indicator for the at least one folder object if the sub-hierarchy of the folder object contains at least one object having an object type of the sub-set associated with the first object and, in response, further displays an assignment symbol between the first object and the folder object and/or the at least one object of the sub-hierarchy.

18 Claims, 12 Drawing Sheets

(56) References Cited

U.S. PATENT DOCUMENTS

| | | | |
|---|---|---|---|
| 6,559,871 | B1 | 5/2003 | Brozowski et al. |
| 6,636,250 | B1 | 10/2003 | Gasser |
| 6,957,230 | B2 * | 10/2005 | Cameron et al. ............. 707/803 |
| 7,334,197 | B2 | 2/2008 | Robertson et al. |
| 7,383,503 | B2 | 6/2008 | Banks |
| 7,392,483 | B2 * | 6/2008 | Wong et al. .................. 715/746 |
| 7,409,644 | B2 | 8/2008 | Moore et al. |
| 7,447,709 | B1 * | 11/2008 | Rozenman et al. |
| 8,539,003 | B2 * | 9/2013 | Tsyganskiy et al. ......... 707/804 |
| 8,543,943 | B2 * | 9/2013 | Rapp ............................ 715/853 |
| 8,863,036 | B2 * | 10/2014 | Sato .............................. 715/854 |
| 2003/0079182 | A1 | 4/2003 | Hofmann |
| 2005/0091252 | A1 | 4/2005 | Liebich et al. |
| 2006/0015851 | A1 | 1/2006 | Poole |
| 2006/0036568 | A1 | 2/2006 | Moore et al. |
| 2006/0218122 | A1 | 9/2006 | Poston et al. |
| 2007/0168885 | A1 | 7/2007 | Muller et al. |

FOREIGN PATENT DOCUMENTS

| | | | | |
|---|---|---|---|---|
| WO | WO 02/101575 | * | 12/2002 | ............. G06F 17/00 |
| WO | WO 02/101575 A2 | | 12/2002 | |

OTHER PUBLICATIONS

European Search Report, dated Feb. 4, 2004, 9 pages.
Dewan, Prasun, "An Inheritance Model for Supporting Flexible Displays of Data Structures," Software and Practice Experience, John Wiley & Sons Ltd., Chichester, Sussex, Great Britain, vol. 21, No. 7, Jul. 1, 1991, pp. 719-738.
U.S. Appl. No. 10/482,840 for Method and Computer System for Graphical Assignments in Hierarchies, filed Jan. 6, 2004.
ABC Technologies Inc., "OROS ABCPlus User's Guide," ABC Technologies Inc., 1998, pp. 83-94.
Dawn J. Sedgley et al., The 123's of ABC in SAP, Using SAP R/3 to Support Activity-Based Costing, Wiley Publishing, 2001, pp. v-xiii; ch. 2, 4, and 10; Index.
Various Screenshots from the Oros 99 Version 4.3 program (15 pgs.).
ABC Technologies Inc. & SAP AG, "White Paper: Oros Bridge 5.0 with SAP: Interfacing ABC Information," 1999 (18 pgs. filed under seal).
ABC Technologies Inc. & SAP AG, "Technical Paper: Building Oros and SAP R/3 Compatible Models in Detail," 1999 (43 pgs. filed under seal).
SAP AG, "R/3 System; The R/3-OROS Integration," Oct. 1998 (17 pgs.).
ABC Technologies Inc. & SAP AG, "Create Activity Module" presentation (20 pgs.).
Jörge Funke, SAP AG, "Activity-Based Budgeting with ABC Technologies OROS and SAP-SEM™," May 2001 (33 pgs.).
SAP AG, "Activity-Based Management," Jun. 2001 (2 pgs.).
SAP AG, "Linking SAP's SEM-BPS with ABC Technologies' OROS, Specification," May 2000 (39 pgs.).
Sandra Otto, "R/3 and OROS in mySAP.com 'The Combined Solution,'" SAP AG, 2000 (23 pgs).
ABC Technologies, "OROS Bridge with SEM, The ABC/M Planning Solution," 2000 (26 pgs.).

\* cited by examiner

| ASSIGNMENT TYPE | OBJECT TYPE | SUBSET | |
|---|---|---|---|
| | | | |
| | | | |
| R | ⬡ 126 | △ 130　□ 132 | 128 |
| S | □ 132 | ⬡ 126　□ 132 | 134 |
| ... | | ... | |

FIG.3

METHODS AND SYSTEMS FOR ENTERING OBJECT ASSIGNMENTS

CROSS-REFERENCE TO RELATED APPLICATION(S)

This application is a continuation of U.S. application Ser. No. 11/100,515, filed on Apr. 7, 2005 (now allowed), the entire disclosure of which is expressly incorporated herein by reference in its entirety.

FIELD OF THE INVENTION

The present invention relates to the field of data processing, and more particularly, without limitation, to graphical user interfaces for entering object assignments.

BACKGROUND OF THE INVENTION

Graphical user interfaces that enable a user to manipulate graphical symbols or items representing objects are generally known. For example, U.S. Pat. No. 5,542,086 shows an object-oriented operating system in which object classes are classified to a file object from different computer systems at the level of the operating system.

Further, U.S. Pat. No. 5,710,894 shows an apparatus for providing dynamic classification of objects. The dynamic classification of objects is performed within a simulator environment using a graphical user interface related to the simulator environment.

Typically, hierarchies that help to structure assignments between objects are administrated through graphical user interfaces (GUIs). Examples of such GUIs include the Microsoft Windows Explorer or the cost assignment view of ABC Technologies OROS program.

For example, in Microsoft Windows Explorer, a folder structure is built in the form of a hierarchy. Objects of three different object types (folders, files and shortcuts) may be graphically assigned to a folder. The computer user, in the following referred to as "user," maintains the hierarchy through:
 (a) a combination of menu entries in the drop down menus of the Windows Explorer,
 (b) menu entries in a context menu launched with the right mouse button, and
 (c) "drag & drop" functions launched with the left or right mouse buttons. Also, shortcuts via the keyboard may be used. For example, new folders or shortcuts may be created by selecting an appropriate menu entry from the "File" menu or from the context menu; for instance, folders or files may be moved or copied by using the right mouse button for "drag & drop". Files, folders or shortcuts may be deleted by using the context menu with the right mouse button. For each object type, only specific activities are allowed. For instance, a folder cannot be graphically assigned to a file or shortcut. A shortcut cannot be graphically assigned to a file but is assigned to the tile in a logical relationship.

The OROS program referenced-above allows the user to graphically define assignments between objects of two different hierarchies. Both hierarchies work similar to the Windows Explorer logic for adding, moving or deleting objects. Both hierarchies support three different object types: center type, account type and cost element type.

For example, a first hierarchy shows the resource view of an enterprise. A center may define a group of resources. Centers may be assigned to other centers. An account may define a specific resource, such as a machine or a building. Accounts may be assigned to centers. A cost element defines a specific type of cost, such as salary, rent etc. Cost element may be assigned to accounts.

A second hierarchy, for example, shows the activity view of an enterprise, where centers define groups of activities, accounts define activities and cost elements, again, define specific types of cost. Similar to the first hierarchy, cost elements are assigned to accounts and accounts are assigned to centers.

When the user creates an assignment between objects of the first hierarchy and the second one, only accounts of the first hierarchy may be assigned to accounts of the second hierarchy and vice versa. The graphical user interface supports this assignment, for example, by displaying the first hierarchy (sender objects) within the first frame and only the accounts of the second hierarchy (receiver objects) as a flat object list within a second frame. When the user selects an account of the first hierarchy in the first frame, an account in the second frame became a possible target for the assignment. This is indicated by little arrows icons next to each of the accounts in the second frame. To create the assignment the user selects one account in the second frame by clicking on the corresponding arrow icon and finally enters an assignment category and an assignment value to specify the assignment.

These examples work very well with applications that only use a limited number of object types (three in the examples above) with a limited number of possible relationships between these objects. Therefore, they provide an easy-to-use solution for graphical maintenance of assignments in application systems that do not show a high degree of complexity as far as the number of object types and their possible dependencies are concerned. However, more complex application systems, such as Enterprise Resource Planning (ERP) systems (e.g., mySAP ERP) usually support a much higher number of object types. Also, the number of possible relations between the various object types is very high.

When applying conventional user interface models to complex application systems, such as ERP systems, the user encounters some inconveniences when creating assignments within or across hierarchies. This becomes obvious when looking at a typical organizational structure of an enterprise in an ERP system from a cost management point of view.

For example, in the SAP ERP system, a controlling area defines an area that is relevant for an enterprise from a cost management point of view. In each controlling area, a hierarchy of cost center groups is defined. Multiple cost centers are assigned to a cost center group. For each cost center multiple cost elements are assigned either directly to the cost center or to activities of the cost center. Cost elements may be grouped into cost element groups. In a further hierarchy, internal orders may be defined. Cost centers with cost element groups or activities may be assigned to internal orders. On the other hand, internal orders may be assigned back to cost centers. The same is true for projects and project elements. Cost center activities may also be assigned to production or sales orders. For convenience of explanation, further object type relations are not listed here. Numerous further object types and their possible relations to other object types within the same or across hierarchies may be taken from "CO-I Overhead Cost Controlling", published in September 1999 by SAP AG (Walldorf, Germany).

Users desire a clear visualization of all actual and possible dependencies between object types. For assignments across hierarchies, a flat list of receiver objects, as in the above-noted example, would contain a large amount of objects of different object types. This leaves the task to identify the right receiver object for an assignment completely with the user (e.g., by applying the right mouse button to every single object). To identify the receiver object is difficult because the information about the location of the receiver object within the hierarchy is hidden.

This problem is addressed by a method and computer system for graphical assignments in hierarchies known from European Patent Document EP 1331553 A1. This method enables the entry of object assignments within and across hierarchies for applications using a large number of object types with a large number of object type relations.

Embodiments consistent with the present invention aim to provide improved methods, computer program products and data processing systems for entering object assignments and addressing one or more of the above-identified drawbacks.

SUMMARY OF THE INVENTION

In accordance with an embodiment of the present invention, a method is provided for entering at least one assignment of a first object, of a first object hierarchy, to at least a second object, of a second object hierarchy. In one aspect, the second object hierarchy may have at least one folder object, and the folder object may be the root of a sub-hierarchy of objects. Further, all objects of the first and second object hierarchies may have object types of a predefined set of object types, wherein the predefined set of object types may have sub-sets. The first object selected from the first object hierarchy may have an object type having an associated sub-set. The sub-set may determine those objects of the second object hierarchy that are assigned to the first object.

For entering one or more assignments, the first and second object hierarchies may be displayed. Next, a user may select one of the objects from the first object hierarchy and, if the folder object has at least one object in its sub-hierarchy that has an object type of the sub-set associated with the selected first object, an indicator symbol may be displayed for the folder object of the second hierarchy. In response to a users selection of the folder object when the indicator symbol is displayed, assignment symbols between the first object and the folder object and/or the at least one object having an object type of the sub-set may further be displayed.

One advantage of the present invention is that it provides a graphical user interface that facilitates the entry of a large number of object assignments. For example, the second object hierarchy may have multiple folder objects, each of which containing a large number of objects having object types of the sub-set associated with the user selected first object of the first object hierarchy. Conventional approaches would require a user to manually enter each individual assignment. In contrast, embodiments consistent with the present invention may reduce the user's data entry task for entering of the desired assignments to entering selections of the folder objects as identified by the indicator symbols.

Embodiments of the invention have applications in various fields, including assignment of objects in a telecommunication network planning and administration, e.g., where the first object of the first object hierarchy is representative of a sender having multiple potential receivers represented by respective second objects in the second object hierarchy. Other applications include logistics, where the sender object is an entity delivering a part and a receiving object is an entity receiving the part. Further, embodiments of the present invention may be particularly advantageous for business software, especially for administration of cost centers and their respective assignments.

In accordance with one embodiment of the invention, the assignment symbols that are displayed between the selected first object and the selected object folder and/or the objects having matching object types are representative of respective edges linking the first and second object hierarchies. The linking edges and the edges of each of the object hierarchies may be stored in database tables.

In accordance with another embodiment, a user may select between first and second assignment entry modes. In the first assignment entry mode, a defining edge is entered between the first object and the folder object in response to a user selection of the folder object when the indicator symbol is displayed.

In addition, dependent edges may be created automatically in response to the user's selection of the object folder when the indicator symbol is displayed. The depending edges depend on the defining edge and link the first object with respective objects of the sub-hierarchy of the folder object having object types within the subset of object types associated with the first object. This first assignment entry mode has the advantage that deletion of assignments is facilitated. Deletion of the assignments is accomplished by deletion of the assignment between the first object and the folder object that causes deletion of the defining edge and thus all dependent edges that depend on the defining edge. This has the advantage that the tedious task of manually deleting a large number of individual assignments may be avoided.

In a second assignment entry mode, only independent edges are entered. When the user selects the folder object with the indicator, symbol assignment symbols are displayed between the first object and the folder object as well as between the first object and the objects of the sub-hierarchy of the folder objects that have a matching object type whereby the assignment symbols are identical.

The assignment symbols may be representative of independent edges that link the first object and the selected folder object in addition to the first object and the objects of the sub-hierarchy of the folder object that have matching object types. In contrast to the first assignment entry mode, the user may manually erase selected ones of the assignment symbols for erasure of the respective independent edges. This has the advantage of giving the user complete freedom regarding entering and deletion of assignments but may require more manual interaction.

According to yet another embodiment of the present invention, a data processing system is provided for the execution of a computer program product in order to perform methods consistent with the invention. The computer program product may include computer executable instructions that are stored on a digital storage medium. Preferably, the data processing system has a rule database for storing of the sub-sets of object types and their association to object types.

In accordance with a further embodiment, the data processing system has a database for storing the nodes and the edges of the first and second object hierarchies, as well as the edges linking the first and second object hierarchies. Preferably, the database has a database table for entering of the edges that enables entry of defining and depending edges as well as entry of independent edges in accordance with the user selected assignment entry mode.

Additional objects and advantages of the invention will be set forth in part in the description which follows, and in part will be obvious from the description, or may be learned by practice of embodiments of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, show certain embodiments of the present invention and, together with the description, help explain some of the principles associated with the invention.

FIG. 3 illustrates an exemplary schematic for a rule base, consistent with an embodiment of the present invention;

DESCRIPTION OF THE EMBODIMENTS

The following description refers to the accompanying drawings, in which, in absence of a contrary representation, the same numbers in different drawings represent similar elements. The implementations set forth in the following description do not represent all implementations consistent with the claimed invention. Instead, they are merely some examples of methods and systems consistent with embodiments of the present invention.

Figure 1:
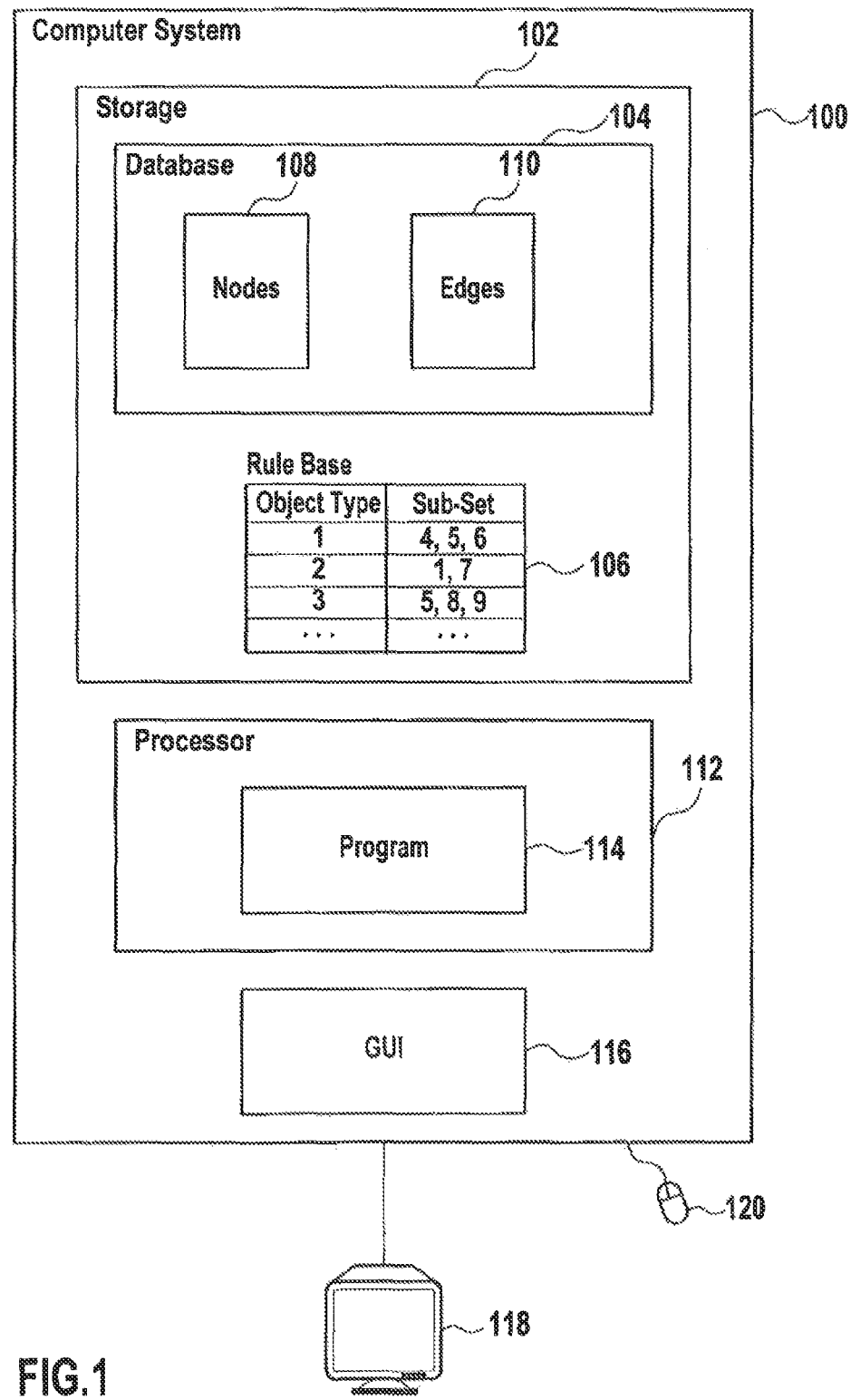
FIG. 1 illustrates a block diagram of an exemplary system environment, consistent with an embodiment of the present invention.

FIG. 1 shows a block diagram of an exemplary computer system 100. Computer system 100 includes a storage 102 for storing a database 104 and a rule base 106. Database 104 serves for storage of database tables 108 and 110 for storing of nodes and edges, respectively, of two or more object hierarchies. Each node identified in database table 108 may be represented by an object having an object type of a pre-defined set of object types.

Rule base 106 serves for storage of object assignment rules. In particular, rule base 106 may store one object assignment rule for each object type of the pre-defined set of object types. An object assignment rule of a given object type identifies the sub-set of object types of the predefined set of object types. The assignment rule restricts the object assignments that may be entered into computer system 100 to assignments of an object having a given object type to another object having an object type of the sub-set of object types associated with the given object type.

For example, object type 1 has the associated sub-set of object types 4, 5, 6. In other words, an object having object type 1 may only be assigned to another object having one of the object types 4, 5 or 6 of the sub-set associated to object type 1. Likewise, object type 2 has associated sub-set 1, 7 of objects types. An object of object type 2 may only be assigned to another object having one of the object types 1 or 7 or the sub-set associated to object type 2, etc.

As shown in the example of FIG. 1, computer system 100 also includes a processor 112 for executing a computer program 114. A graphical user interface (GUI) 116 of computer system 100 serves to provide data display and entry windows on a computer monitor 118. A computer mouse 120 or another suitable input device is coupled to computer system 100 in order to facilitate a user's data entry via GUI 116.

In operation, a user may select two or more of the object hierarchies stored in database 104 for display on computer monitor 118. The user may enter an object assignment linking two of the selected object hierarchies by selecting a first object in one of the object hierarchies. In response, computer program 114 retrieves the object assignment rule associated with the object type of the selected first object from rule base 106.

By means of the object assignment rule, computer program 114 identifies objects within the other object hierarchy that have object types of the sub-set indicated in the retrieved object assignment rule. Indicator symbols are displayed for the folder objects containing objects of the relevant object types and/or indicator symbols for the individual objects of the relevant object types. A user may enter object assignments between the first object and the objects having the relevant object types contained in one of the folder objects by selecting that folder object. If the folder object has a large number of objects having the relevant object types, this approach prevents the tedious task of manually entering the object assignments from the first object to the objects having the relevant object types contained in the sub-hierarchy of a folder object.

Figure 2:
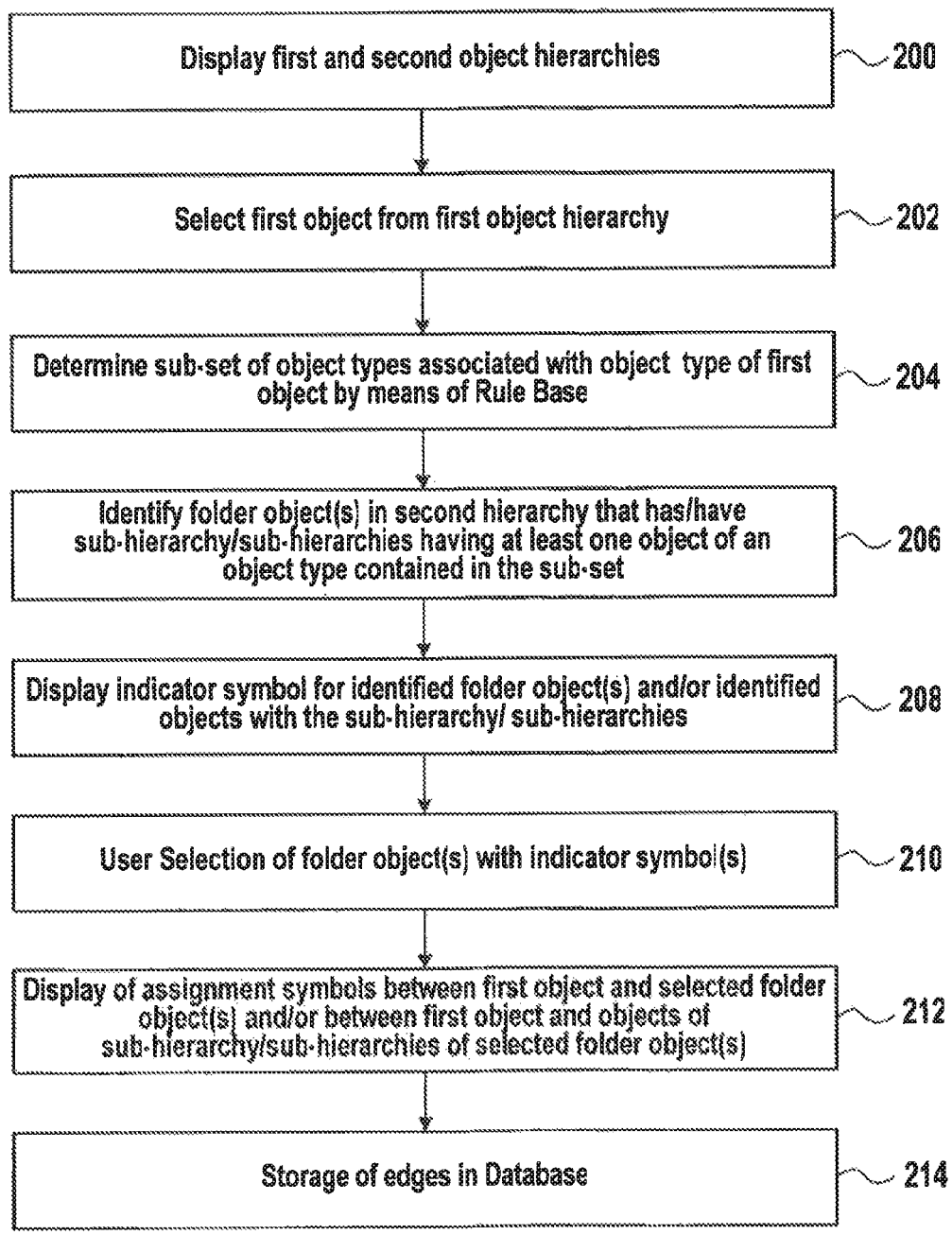
FIG. 2 illustrates a flowchart of an exemplary method, consistent with an embodiment of the present invention.

FIG. 2 shows a flow chart of an exemplary method that may be implemented with computer system 100. In step 200, first and second object hierarchies are selected by a user and displayed on the computer monitor. In step 202, the user selects a first object from the first object hierarchy. By way of example, the selection of the first object may be performed by clicking on the first object by means of the computer mouse.

In step 204, the object assignment rule associated with the object type of the first objects is retrieved from the rule base in order to determine the sub-set of object types associated with the object type of the first object.

In step 206, folder objects in the second hierarchy are identified that have one or more sub-hierarchies containing at least one object of an object type contained in the sub-set of object types determined in step 204. In step 208, an indicator symbol is displayed for each one of the identified folder objects and/or the identified objects within the folder objects if the folder objects are displayed in an expanded view.

In step 210, a user selects one or more of the folder objects that have indicator symbols. In response, assignment symbols between the first object and the selected folder objects and/or between the objects within the respective sub-hierarchies are displayed, at step 212. In step 214, the object assignments are stored as edges in the database.

FIG. 3 shows an example for rule base 106. Rule base 106 stores object assignment rules for various object assignment types. In particular, rule base 106 may include object assignment types regarding object assignments within a current object hierarchy, such as parent-child object type assignments or child-parent object type assignments.

Furthermore, rule base 106 shows an object assignment rule 122 of object assignment type receiver "R" and object assignment rule 124 of object assignment type sender "S". Object assignment rule 122 relates to object type 126 that is graphically represented by a hexagon. Sub-set 128 containing object types 130 and 132 is associated with object type 126 which constitutes object assignment rule 122. Object type 130 is graphically represented by a triangle and object type 132 is graphically represented by a square. According to object assignment rule 122, an object having object type 126 may only be a sender object for a receiver object if the receiver object has one of the object types 130 or 132. It is to be noted that rule base 106 is not essential for embodiments of the present invention. If no rule base is used, each object type may be assigned to any other object type.

Object assignment rule 124 relates to object type 132 as a receiver object. Object assignment rule 124 has sub-set 134 of object types 126 and 132. According to object assignment rule 124, an object having object type 132 may only be the receiver object for a sender object if the sender object has one of the object types 126 or 132 contained in sub-set 134.

It is to be noted that the number of object types contained in one of the sub-sets of rule base 106 is not limited and may contain a large number of object types depending on the application.

Figure 4:
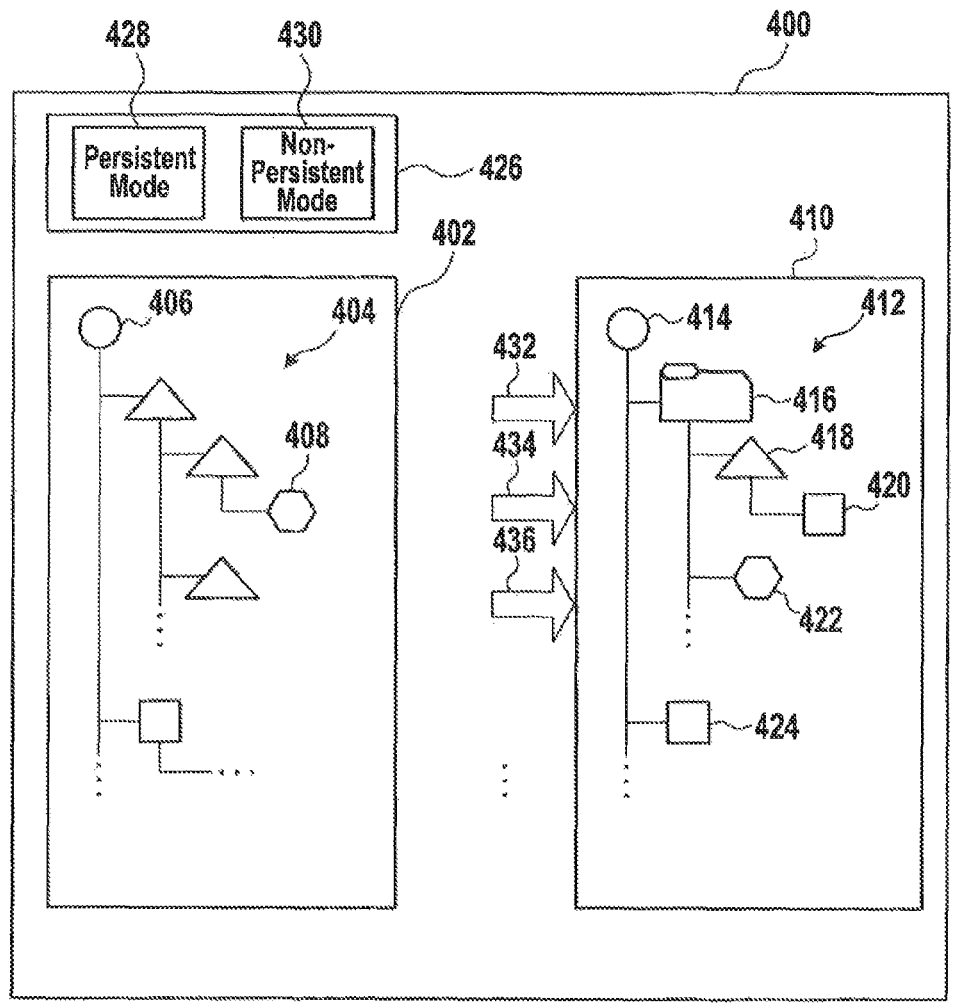
FIG. 4 illustrates an exemplary display of first and second object hierarchies on a graphical user interface, consistent with an embodiment of the present invention.

FIG. 4 shows an exemplary window 400 displayed on computer monitor 118 (cf. FIG. 1). Window 400 has an area 402 for displaying a user selected object hierarchy 404. Object hierarchy 404 has root object 406 from which a number of objects depend. Object hierarchy 404 has object 408 of object type 126 (cf. rule base 106).

Window 400 also includes an area 410 for display of another user selected object hierarchy 412. Consistent with embodiments of the invention, window 400 may have additional areas for display of additional user selected object hierarchies.

Object hierarchy 412 has root object 414. Folder object 416 depends on root object 414. Folder object 416 is the root of a sub-hierarchy containing a number of objects including objects 418, 420 and 422.

In addition, object hierarchy 412 has at least one object 424 that directly depends on root object 414. In addition, object hierarchy 412 may include a large number of additional folder objects each containing one or more sub-hierarchies, in other words folder object and objects. It is to be noted that folder object 416 has objects 418 and 420 of object types 130 and 132, respectively (cf. rule base 106 of FIG. 3).

As shown in the example of FIG. 4, window 400 further includes an action bar 426 containing virtual buttons 428 and 430. The button 428 serves for a user's selection of a persistent entry mode, and button 430 for selection of a non-persistent entry mode. The difference between the persistent and non-persistent entry modes will be explained in greater detail in the following by making reference to FIGS. 5 to 8.

For the purpose of explanation, it is assumed that the user has clicked on button 428 for selection of the persistent entry mode. When the user selects object 408 of object hierarchy 404, e.g., by clicking on object 408, the following happens: Computer program 114 (cf. FIG. 1) retrieves the object assignment rule for the object type 126 or object 408 from rule base 106 (cf. FIGS. 1 and 3). The retrieved object assignment rule has a sub-set of object types. Computer program 114 identifies objects within object hierarchy 412 that have one of the object types as given by the sub-set. In the example considered here, these are the objects 418 and 420. In addition, there may be a large number of additional objects having object types contained in the sub-set, which are not shown in FIG. 4 for ease of explanation.

Computer program 114 generates an output in order to display, for example, indicator symbols 432, 434, and 436. Indicator symbol 432 points to folder object 416 as folder object 416 contains objects having object types contained in the sub-set. Indicator symbol 434 points to object 418 and indicator symbol 436 points to object 420 as objects 418 and 420 have object types contained in the sub-set associated with object type 126 of object 408. If there are additional objects within object hierarchy 412 having the relevant object types contained in the sub-set, corresponding additional indicator symbols may be displayed. Likewise, if there are additional folder objects within object hierarchy 412 containing at least one object of the relevant object type contained in the sub-set, corresponding additional indicator symbols pointing to these additional folder objects may be displayed.

The user may now enter multiple object assignments by means of a single input operation. By selecting folder object 416, e.g., by clicking on folder object 416 by means of computer mouse 120 (cf. FIG. 1), all object assignments between object 408 and the objects contained in folder object 416 having the relevant object types are created.

In the selected persistent entry mode, the object assignment between object 408 and folder object 416 may be represented by double-headed arrow symbol 438, whereas the object assignments between object 408 and objects 418, 422 within the sub-hierarchy of folder object 416 may be displayed by means of dashed double headed arrow symbols 440. If there are additional objects within the sub-hierarchy of folder object 416 that have one of the relevant object types, corresponding additional arrow symbols 440 may be displayed to show the respective additional object assignments.

It is to be noted that a user may enter a large number of object assignments by selecting a folder object identified by an indicator symbol. This avoids the need for multiple data entry operations in order to enter each object assignment separately.

In the selected persistent entry mode, the edge that is represented by arrow symbol 438 is a defining edge, whereas the edges represented by arrow symbols 440 are dependent edges that depend from the defining edge. The dependent edges cannot be deleted individually but only collectively by deleting the defining edge from which the dependent edges depend.

In the embodiment considered here, a user may thus not delete individual arrow symbols 440 for deletion of the corresponding dependent edges, but only arrow symbol 438 for deletion of the corresponding defining edge and thus all arrow symbols 440 representing dependent edges depending from that defining edge.

Figure 5:
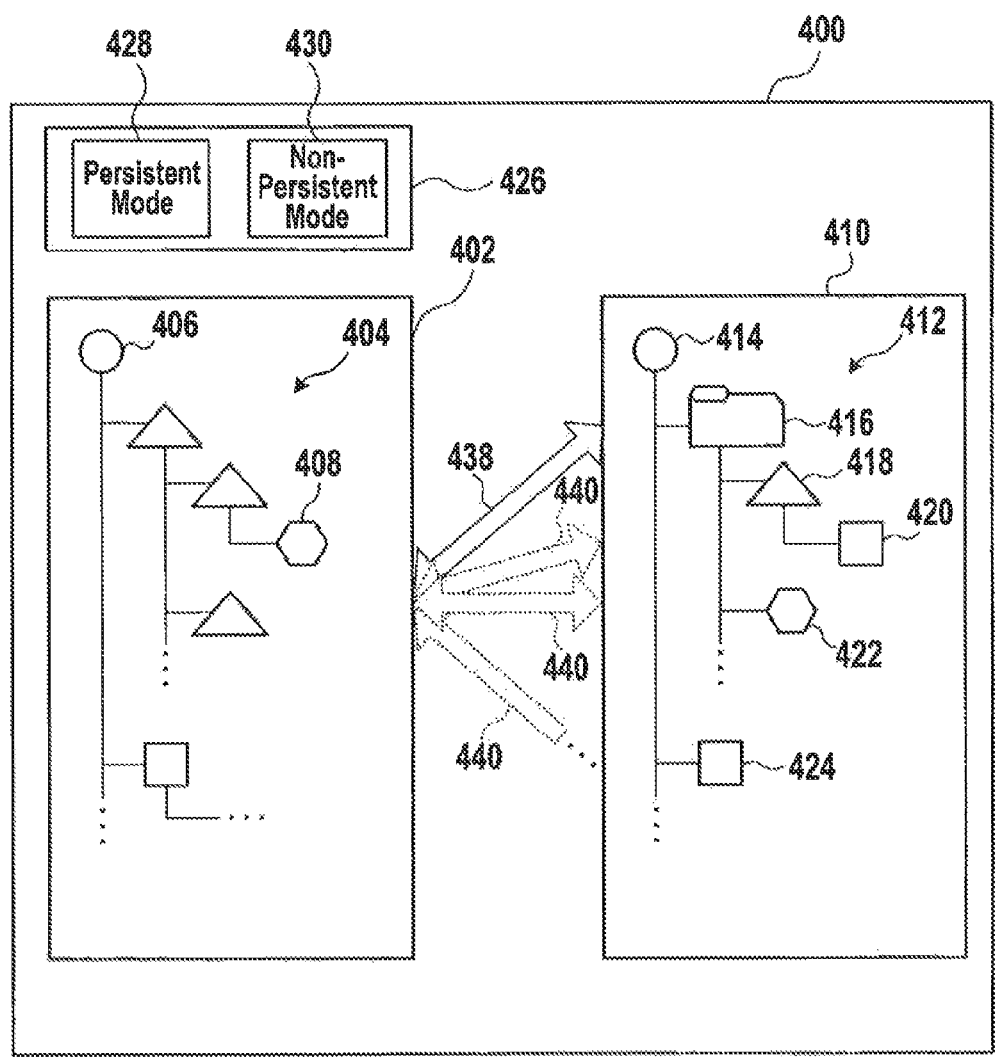
FIG. 5 illustrates exemplary object assignments between the object hierarchies in a persistent mode, consistent with an embodiment of the present invention.

It is to be noted that in the embodiment of FIG. 5, the folder object 416 is shown in an expanded view, i.e., a view showing the sub-hierarchy of objects of which folder object 416 is the root. Alternatively, a user may select a compressed view, i.e., a view where the sub-hierarchy of objects is not visible, but only the root of the sub-hierarchy, i.e., folder object 416. In the latter case, only arrow symbol 438 is shown. When the user performs an input operation to switch into the expanded view, the sub-hierarchy becomes visible and the arrow symbols 440 are displayed as well.

Figure 6:
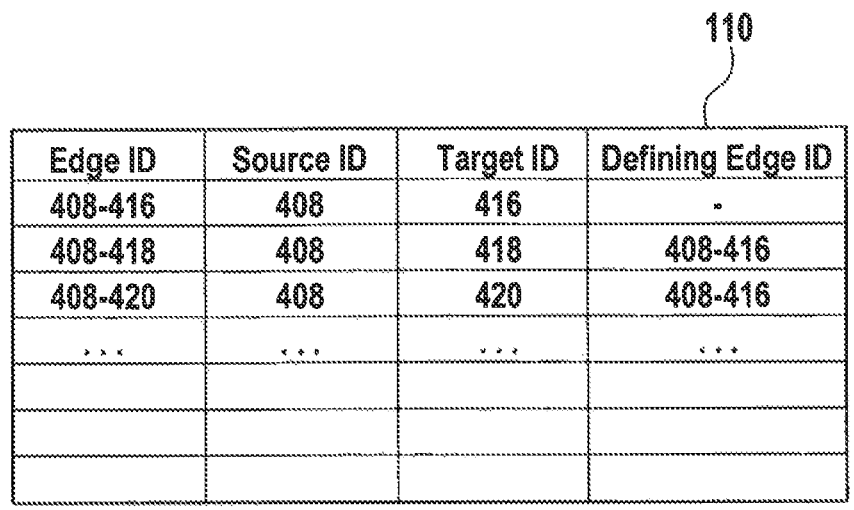
FIG. 6 illustrates an exemplary database table for storing the object assignments in a persistent mode, consistent with an embodiment of the present invention.

FIG. 6 shows an exemplary implementation of database table 110 (cf. FIG. 1) that is useful for the persistent data entry mode. In the example considered here, the unique identifier ID of an edge is given by the reference numeral of its source object and its target object. Thus, the defining edge as represented by arrow symbol 438 has edge ID 408-416 as its source object has source ID 408 and its target object has target ID 416.

Since arrow symbol 438 represents a defining edge, no entry is made to the defining edge ID column of database table 110. The edge linking objects 408 and 418 have edge ID 408-418 and depend from edge having edge ID 408-416. The defining edge of dependent edge 408-418 is identified in database table 110 by entering the corresponding edge ID of the defining edge in the defining edge ID column of database table 110. The same applies analogously for the edge between object 408 and 420 and any additional objects having one of the relevant object types that may be contained within folder object 416.

For erasing the object assignments between object 408 and the objects within folder object 416, the user may select arrow symbol 438 and perform a delete operation. This way, arrow symbol 438 and arrow symbols 440 representing dependent edges that depend from the defining edge as represented by arrow symbol 438 are erased, as well as the corresponding entries in database table 110.

Figure 7:
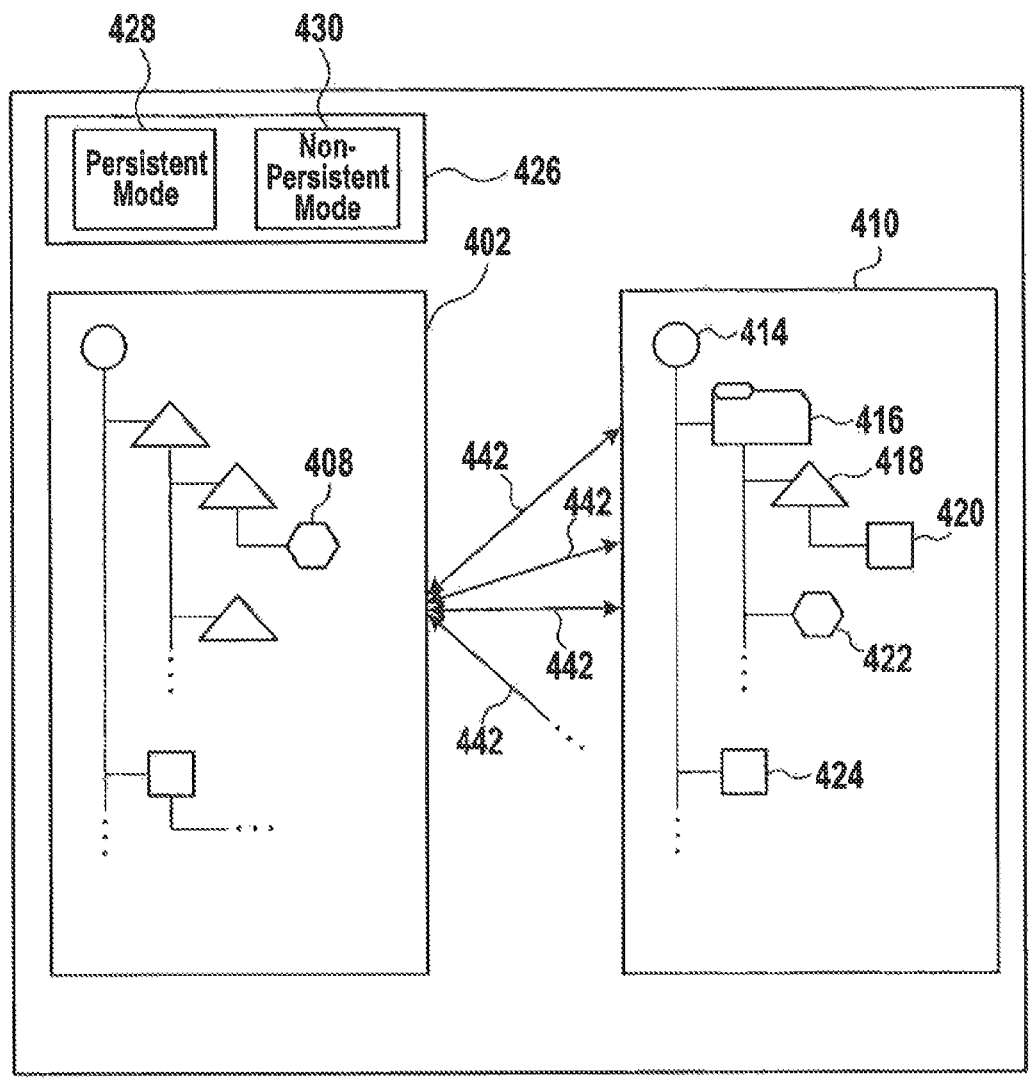
FIG. 7 illustrates exemplary object assignments in a non-persistent mode consistent, consistent with an embodiment of the present invention.

FIG. 7 illustrates an exemplary implementation of the non-persistent data entry mode, that is selected by clicking on button 430. In the non-persistent mode, the user may select folder object 416 for creation of object assignments the same way as in the persistent mode, as explained above with reference to FIGS. 4, 5, and 6. In the persistent mode, the edges that are thus created are represented by arrow symbols 442. In contrast to the persistent mode, all of the edges that have been entered are independent edges that may be deleted individually. Hence, the user may select one or more of the arrow symbols 442 in order to perform a delete operation of the selected arrow symbols and, thus, the independent edges that are represented by those selected arrow symbols.

Figure 8:
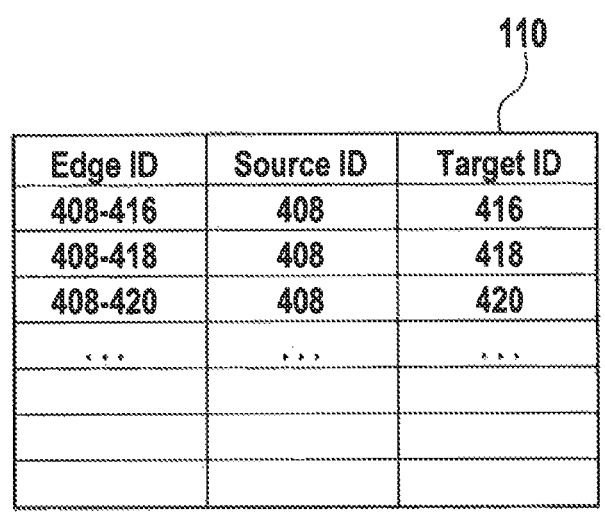
FIG. 8 illustrates an exemplary database table for storing the object assignments in a non-persistent mode, consistent with an embodiment of the present invention.

FIG. 8 shows an exemplary implementation of database table 110 for storage of the independent edges. Table 110 does not require a defining edge ID column as all edges that are entered in non-persistent mode are independent from each other and may be deleted independently from each other. It is also possible to use database table 110 of FIG. 6 for the non-persistent mode in which case no entry is made in the defining edge ID column for the independent edges.

Figure 9:
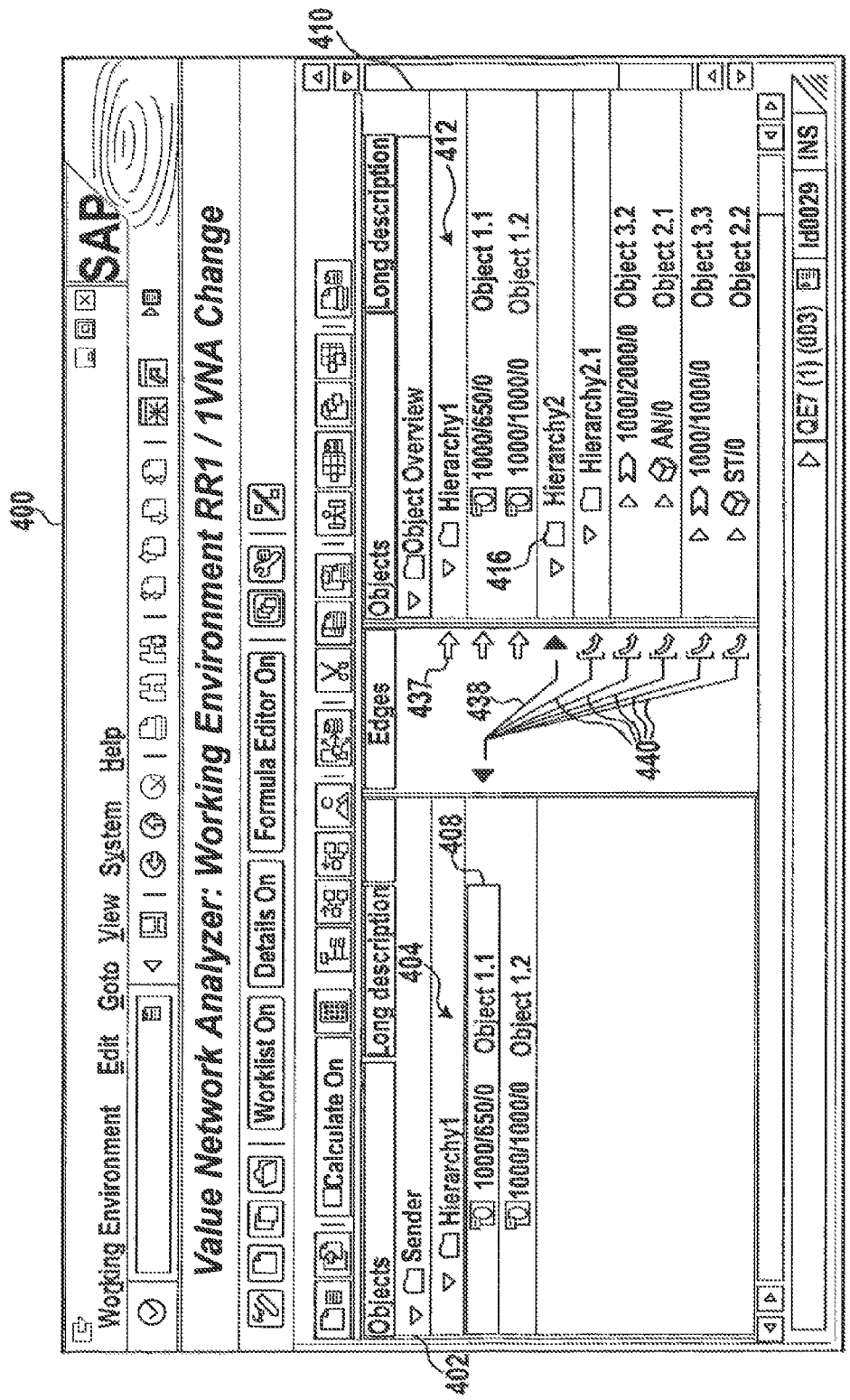
FIG. 9 illustrates an exemplary screen shot of a graphical user interface, consistent with an embodiment of the present invention.

FIG. 9 shows another embodiment consistent with the present invention. Like elements of FIG. 9 and the preceding figures are designated by the same reference numerals. In the embodiment of FIG. 9, the user has selected the persistent data entry mode. Further, the user has selected object 408 in object hierarchy 404 which resulted in display of indicator symbols 437 for highlighting of all folder objects and objects having one of the relevant object types. In the example considered here, the user has selected folder object 416 which resulted in the creation of a defining edge between object 408 and folder object 416 as represented by arrow symbol 438 and dependent edges as represented by arrow symbols 440.

Figure 10:
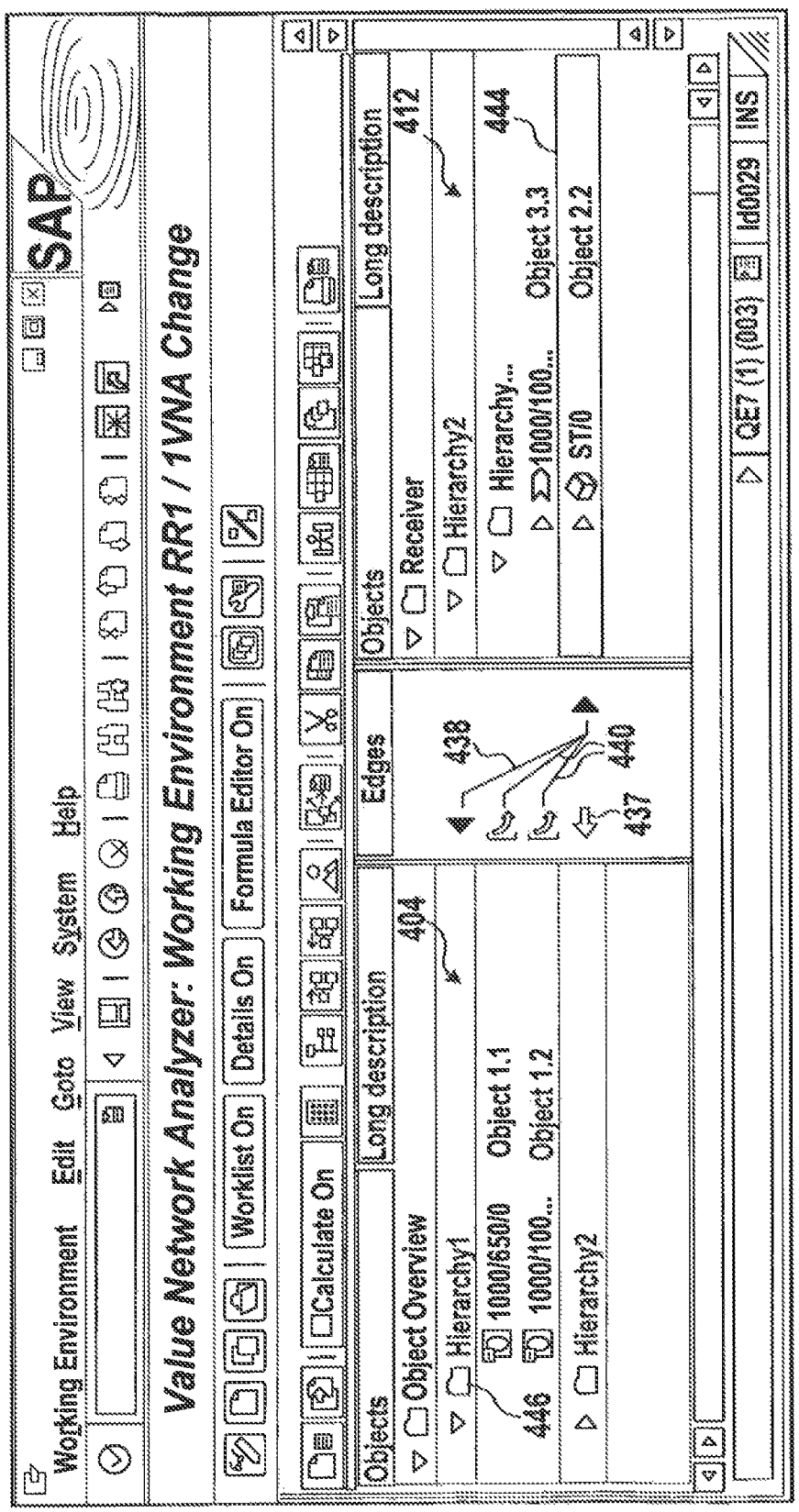
FIG. 10 illustrates an exemplary screen shot of the selection of an object in the second hierarchy.

FIG. 10 shows another example in the persistent data entry mode. In the example considered, here, object 444 has been selected by the user in object hierarchy 412 for creation of object assignments to folder object 446 of object hierarchy 404 and to objects within the sub-hierarchy of which folder object 446 is the root object as symbolized by the respective arrow symbols 438 and 440.

Figure 11:
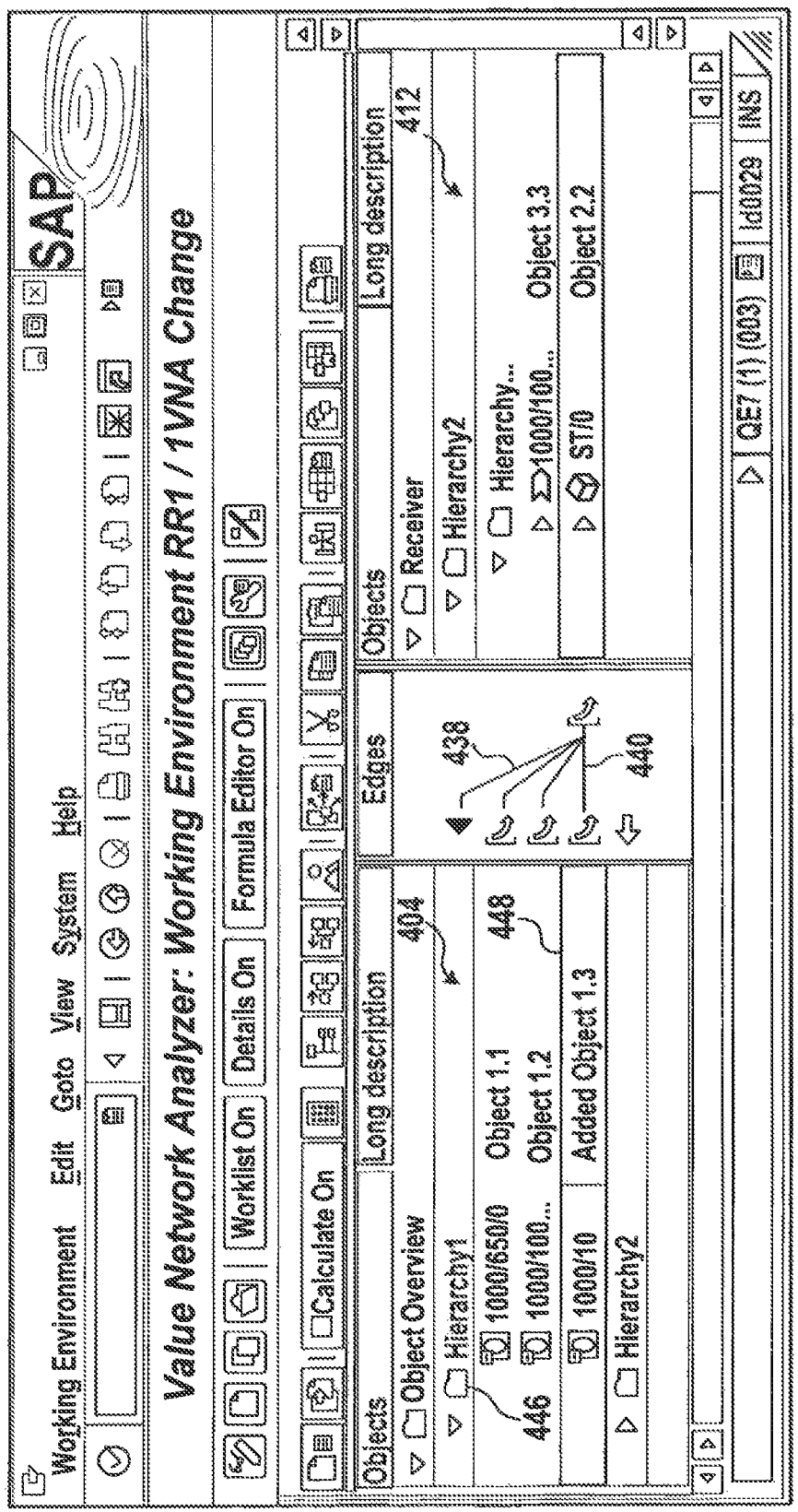
FIG. 11 illustrates an exemplary screen shot of the insertion of an object in the first object hierarchy and the inheritance of dependent edges.

When they user adds an object to the sub-hierarchy of folder object 446 the added object automatically inherits the object assignment as defined by the defining edge represented by arrow symbol 438. This is shown in the exemplary embodiment of FIG. 11, where an arrow symbol 440 is added automatically when object 448 is added to the sub-hierarchy of folder object 446. The edge represented by the additional arrow symbol 440 is a dependent edge that depends from the defining edge represented by arrow symbol 438 and which is entered into the database table 110 (cf. FIG. 6).

Figure 12:
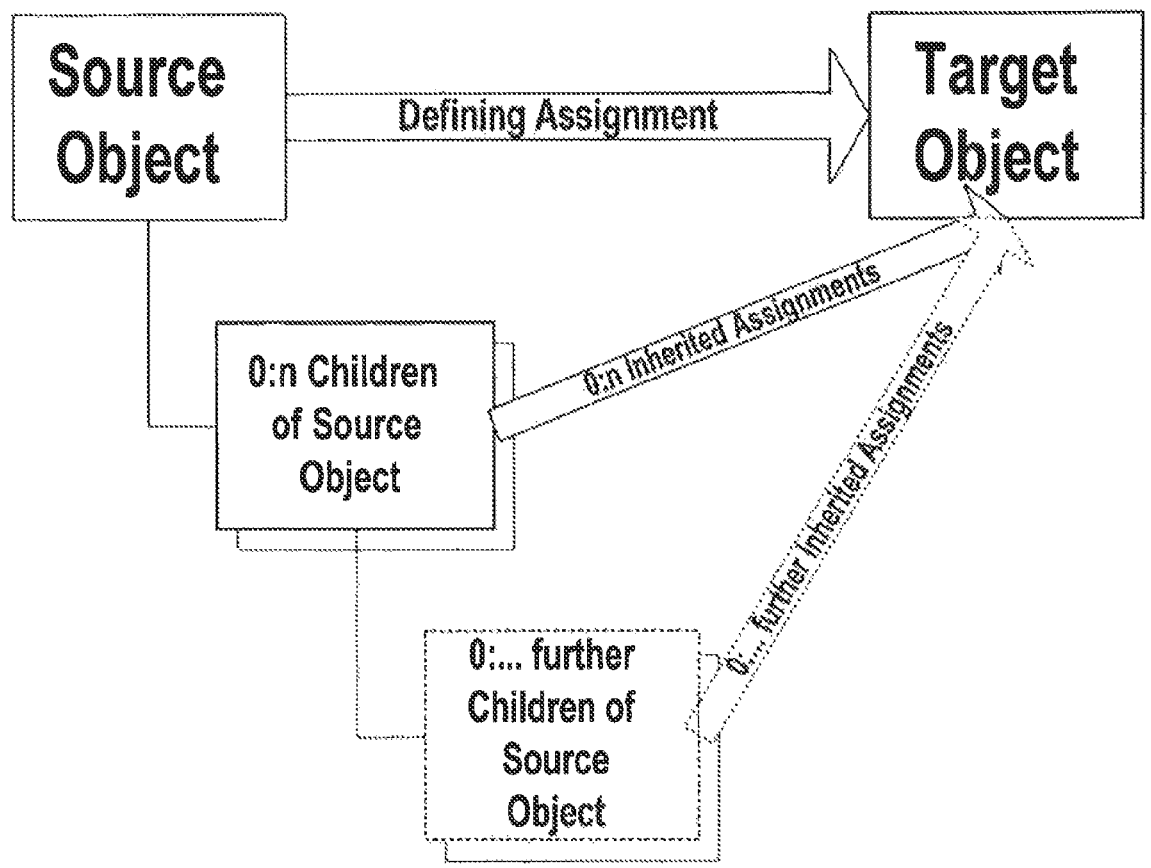
FIG. 12 illustrates an exemplary block diagram of the inheritance of assignments of children objects of a source object that is assigned to a target object.

FIG. 12 illustrates an example of the inheritance of assignments when children are added to a source object. As illustrated in FIG. 12, adding children objects to a sub-hierarchy of which the source object is the root node results in an automatic inheritance of the respective object assignments in the persistent data entry mode.

Other embodiments of the invention will be apparent to those skilled in the art from consideration of the specification and practice of the embodiments of the invention disclosed herein. It is intended, therefore, that the specification and examples be considered as exemplary only, with a true scope and spirit of the invention being indicated by the following claims.

| List of Reference Numerals | |
|---|---|
| 100 | computer system |
| 102 | storage |
| 104 | data box |
| 106 | rule base |
| 108 | database table |
| 110 | database table |
| 112 | processor |
| 114 | computer program |
| 116 | GUI |
| 118 | computer monitor |
| 120 | computer mouse |
| 122 | object assignment rule |
| 124 | object assignment rule |
| 126 | object type |
| 128 | sub-set |
| 130 | object type |
| 132 | object type |
| 134 | sub-set |
| 400 | window |
| 402 | area |
| 404 | object hierarchy |
| 406 | root object |
| 408 | object |
| 410 | area |
| 412 | object hierarchy |
| 414 | root object |
| 416 | folder object |
| 418 | object |
| 420 | object |

-continued

| List of Reference Numerals | |
|---|---|
| 422 | object |
| 424 | object |
| 426 | action bar |
| 428 | button |
| 430 | button |
| 432 | indicator symbol |
| 434 | indicator symbol |
| 436 | indicator symbol |
| 437 | indicator symbol |
| 438 | arrow symbol |
| 440 | arrow symbol |
| 442 | arrow symbol |
| 444 | object |
| 446 | folder object |
| 448 | object |

What is claimed is:

1. A computer-implemented method for creating an assignment between a first object hierarchy and a second object hierarchy, the method comprising the following operations performed by at least one processor:
receiving, based on input from a user, a selection of a first object in the first object hierarchy;
determining a sub-set of object types associated with an object type of the selected first object;
identifying a folder object in the second object hierarchy that has a sub-hierarchy with at least a second object having an object type corresponding to the determined sub-set of object types;
providing instructions to display to the user an indication symbol pointing to the identified folder object and sub-hierarchy with second object having an object type corresponding to the determined sub-set of object types;
in response to a selection of the identified folder object by the user, storing data specifying an assignment between the first object in the first object hierarchy and at least one of the selected folder object in the second object hierarchy or the second object in the sub-hierarchy of the second object hierarchy;
providing instructions to display a first assignment symbol representative of a defining edge between the first object and the folder object;
providing instructions to display a second assignment symbol representative of respective dependent edges between the first object and a plurality of sub-objects in the sub-hierarchy of the second object hierarchy;
assigning a unique identifier to the defining edge;
assigning a unique identifier to each of the dependent edges; and
storing the defining and depending edges in a database table using the respective unique identifiers as keys, whereby the database table includes a column for storing the unique identifier of the defining edge for identification of the dependent edges that depend from the defining edge.

2. The method of claim 1, further comprising:
providing instructions to display assignment symbols between the first object in the first object hierarchy and the selected folder object in the second object hierarchy.

3. The method of claim 1, further comprising:
providing instructions to display assignment symbols between the first object in the first object hierarchy and a plurality of sub-objects in the sub-hierarchy of the second object hierarchy, wherein the plurality of sub-objects include the second object.

4. The method of claim 1, wherein determining a sub-set of object types associated with an object type of the selected first object comprises:
accessing a rule base from a memory device, the rule base storing a set of object types associated with the selected first object.

5. The method of claim 1, wherein the indication symbol is an arrow.

6. A data processing system, comprising:
a memory device that stores a set of instructions; and
at least one processor that executes the set of instructions to perform the following operations:
receiving, based on input from a user, a selection of a first object in the first object hierarchy;
determining a sub-set of object types associated with an object type of the selected first object;
identifying a folder object in the second object hierarchy that has a sub-hierarchy with at least a second object having an object type corresponding to the determined sub-set of object types;
providing instructions to display to the user an indication symbol pointing to the identified folder object and sub-hierarchy with second object having an object type corresponding to the determined sub-set of object types;
in response to a selection of the identified folder object by the user, storing data specifying an assignment between the first object in the first object hierarchy and at least one of the selected folder object in the second object hierarchy or the second object in the sub-hierarchy of the second object hierarchy;
providing instructions to display a first assignment symbol representative of a defining edge between the first object and the folder object; and
providing instructions to display a second assignment symbol representative of respective dependent edges between the first object and a plurality of sub-objects in the sub-hierarchy of the second object hierarchy;
assigning a unique identifier to the defining edge;
assigning a unique identifier to each of the dependent edges; and
storing the defining and depending edges in a database table using the respective unique identifiers as keys, whereby the database table includes a column for storing the unique identifier of the defining edge for identification of the dependent edges that depend from the defining edge.

7. The data processing system of claim 6, wherein the set of instructions further configure the at least one processor to perform the following operation:
providing instructions to display assignment symbols between the first object in the first object hierarchy and the selected folder object in the second object hierarchy.

8. The data processing system of claim 6, wherein the set of instructions further configure the at least one processor to perform the following operation:
providing instructions to display assignment symbols between the first object in the first object hierarchy and a plurality of sub-objects in the sub-hierarchy of the second object hierarchy, wherein the plurality of sub-objects include the second object.

9. The data processing system of claim 6, wherein the set of instructions further configure the at least one processor to perform the following operation:

a rule base from a memory device, the rule base storing a set of object types associated with the selected first object.

10. The data processing system of claim 6, wherein the indication symbol is an arrow.

11. A computer-implemented method comprising the following operations performed by at least one processor:
receiving, based on input from a user, the identification of at least one object to add to a sub-hierarchy of a source object;
adding the at least one object to the sub-hierarchy of the source object;
identifying at least one respective object assignment between the sub-hierarchy of the source object and a target object;
providing instructions to display to the user an indication symbol; and
storing data to cause the added object to automatically inherit the identified at least one respective object assignment between the sub-hierarchy of the source object and the target object.

12. The method of claim 11, wherein the source object is the root node of the sub-hierarchy.

13. The method of claim 11, further comprising:
receiving, based on input from the user, the identification of an additional object to add to the sub-hierarchy of the source object; and
adding the additional object to the sub-hierarchy of the source object.

14. The method of claim 13, further comprising:
storing data to cause the additional object to automatically inherit the identified at least one respective object assignment.

15. A data processing system, comprising:
a memory device that stores a set of instructions; and
at least one processor that executes the set of instructions to perform the following operations:
receiving, based on input from a user, the identification of at least one object to add to a sub-hierarchy of a source object;
adding the at least one object to the sub-hierarchy of the source object;
identifying at least one respective object assignment between the sub-hierarchy of the source object and a target object;
providing instructions to display to the user an indication symbol; and
storing data to cause the added object to automatically inherit the identified at least one respective object assignment between the sub-hierarchy of the source object and the target object.

16. The data processing system of claim 15, wherein the source object is the root node of the sub-hierarchy.

17. The data processing system of claim 15, wherein the set of instructions further configure the at least one processor to perform the following operation:
receiving, based on input from the user, the identification of an additional object to add to the sub-hierarchy of the source object; and
adding the additional object to the sub-hierarchy of the source object.

18. The data processing system of claim 17, wherein the set of instructions further configure the at least one processor to perform the following operation:
storing data to cause the additional object to automatically inherit the identified at least one respective object assignment.

* * * * *